United States Patent [19]

Clee

[11] Patent Number: 4,459,970
[45] Date of Patent: Jul. 17, 1984

[54] SOLAR STEAM GENERATING AND DISTRIBUTION SYSTEM

[76] Inventor: Douglas Clee, 142 Garth Rd., Scarsdale, N.Y. 10583

[21] Appl. No.: 330,035

[22] Filed: Dec. 14, 1981

[51] Int. Cl.³ .................................................. F24J 3/02
[52] U.S. Cl. ..................................... 126/415; 126/440; 60/641.8; 60/641.15; 203/DIG. 1
[58] Field of Search ....................... 126/415, 416, 440; 60/641.11, 641.15, 641.8; 202/234; 203/DIG. 1

[56] References Cited

U.S. PATENT DOCUMENTS

| | | | |
|---|---|---|---|
| 4,057,048 | 11/1977 | Maine | 126/440 |
| 4,136,670 | 1/1979 | Davis | 126/440 |
| 4,166,769 | 9/1979 | Dukess | 202/234 |
| 4,197,162 | 4/1980 | Cardinal | 202/234 |
| 4,360,004 | 11/1982 | Testolini | 126/415 |

FOREIGN PATENT DOCUMENTS 1599809 10/1981 United Kingdom ................ 202/234

*Primary Examiner*—Samuel Scott
*Assistant Examiner*—Margaret A. Focarino

[57] ABSTRACT

Applicant's invention comprises a system for the generation and distribution of steam by solar energy comprising apparatus for the solar energy generation of steam. The system is comprised of an enclosed structure to be erected over the surface of a body of source water with the structure containing a plurality of transparent lenses which are adapted to receive incident solar rays and which force these rays at or just below the surface of the source water within a limited area. This causes surface boiling of the source water which generates steam within the enclosed structure.

The system also comprises distribution conduits from the enclosed structure to places remote from the structure and booster stations which communicate with the apparatus through the conduits. Each booster station comprises a reservoir for storing the condensed water from the apparatus with an enclosure over the reservoir which contains a plurality of transparent lenses which focus incident solar rays at or just below the surface of the condensed water in the reservoir within a limited area to regenerate steam within the booster station, and outgoing distribution conduits to places remote from the booster station.

3 Claims, 2 Drawing Figures

SOLAR STEAM GENERATING AND DISTRIBUTION SYSTEM

BACKGROUND OF THE INVENTION

1. Field of the Invention

The present invention is concerned with the utilization of solar energy to produce steam and hot water for use in heating residences, swimming pools, and other utilizations for which solargenerating of hot water is presently used.

In addition to providing apparatus for producing steam and hot water, the present invention may be utilized for obtaining fresh potable water from salt water or from other water sources which contain various impurities in solution or suspended form by vaporizing the water to separate it from the unwanted contents.

The present invention also provides a system for transferring water from one location to another utilizing solar energy. Since the water is transferred in vaporized form, it is also possible to transfer the water from one level to a higher level using solar energy. This is particularly advantageous if the system is adapted for use in irrigation systems.

The development of solar energy is of increasing importance because of the world-wide shortage of petroleum and other conventional fuel sources, the negative environmental effects of using some conventional fuels and nuclear fuels, as well as the increasing economic strains on the nation caused by the rapidly increasing cost of conventional fuels, especially petroleum. Among some of the practical drawbacks of the greater utilization of solar energy up to now have been the inability to conveniently generate very hot water or steam using solar energy as the source and to distribute the energy generated by solar sources.

An object of the present invention is to provide an apparatus utilizing solar energy to generate steam by concentrating the rays of solar energy on a limited surface area on a confined water supply to cause a rapid vaporization of the water in a confined area to produce steam efficiently. The water, which is surface vaporized, is confined within a greenhouse-type structure made up of multiple prisms or lenses arranged to concentrate the sun's rays on the limited surface area and constructed strong enough to withstand at least a moderate steam pressure.

The steam generated may be utilized immediately in the vicinity of the generator apparatus or distributed through conduits to booster stations which will keep the steam in the vaporized form and add sufficient pressure to move through conduits to more booster stations. The booster stations may serve also as resevoirs for water in the cases where the sun is not visible as a source of energy at any particular time and the system may also serve as an irrigation distribution system.

The heated water in the form of vaporized water or steam can be distributed to higher elevations since the steam will rise. The apparatus as indicated may also be utilized to purify water through vaporization and is particularly adapted to providing potable water from salt water sources.

2. Prior Art

No prior art presently known to the Applicant discloses a system such as disclosed in this application. U.S. Pat. No. 4,057,048 Maine discloses a solar heating structure of a dome configuration of lenses which concentrate the sun's rays on a volume of water to moderately heat water which is constantly being replaced by cool water.

U.S. Pat. No. 4,166,769 discloses a sphere-like structure for concentrating solar energy within a core wherein fluid is heated and it may be utilized to generate steam. In this case, however, a whole body of water must be heated as opposed to a rapid heating steam system which vaporized surface water within a limited confined area.

SUMMARY OF THE INVENTION

The present invention comprises apparatus for generating steam utilizing solar energy and includes a distribution system for the solar generated steam to distant points through a network of intermediate booster stations which also utilize solar energy. The system also may be utilized as the means for the distribution of irrigation water.

The system is especially useful for providing clean water suitable for irrigation and drinking from salt water sources and even from sources of water contaminated by sewage. The distribution system is also useful in delivering clean water to a point at an elevation higher than the source utilizing solar energy without employing mechanical pumping apparatus or energy sources other than solar.

The steam-generating apparatus comprises a greenhouselike structure erected over the surface of a body of water which is the source of the water for the system. The structure is comprised of at least one and preferably of multiple prisms or lenses arranged in a pattern to concentrate available sun rays throughout the day, depending upon the sun's position, on a confined area of the surface of the water within the structure, at or just below the surface of the water so as to cause rapid heating and vaporization of the surface water to generate steam. Preferably the lenses should be mounted to change azimuth and elevation angle to track the sun during the day to maintain the maximum exposure to and concentration of rays at or just below the surface of the water. The structure is built to withstand low pressure steam so that "a head of steam" may be developed. Known types of pressure relief valves are incorporated as safety measures and pressure gauges to monitor the steam pressure are provided.

In order to control the system, relief valves are provided to release steam to the atmosphere when not distributed. The degree of heating may be controlled by covering portions of the lens structure or otherwise shutting out the solar rays.

When sufficient steam has been generated to produce a positive pressure within the structure, the steam may be distributed through conduits to structure(s) for heating purposes, hot water, or to warm swimming pools and other known uses.

Booster stations are provided in the system when it is desired to distribute the steam over significant distances. This is necessary because without additional heat input, the vaporized water would condense.

When booster stations are used in the system, they are provided with controllable check valves on the incoming conduit side in order to prevent unwanted back flow of vapor when the booster stations is vaporizing water.

The booster stations comprise a reservoir structure which conventionally is a concrete basin which receives either liquid water or condensed steam coming in from the main station, and another greenhouse-like structure for concentrating the sun's rays on the surface of the water within the reservoir.

Shutter controls are provided so that the reservoir does not overheat in the absence of water therein as well as for controlling the rate and amount of steam regenerated in the reservoir utilizing the vaporized or condensed water from the main station.

DESCRIPTION OF AN ILLUSTRATIVE EMBODIMENT OF THE INVENTION

Figure 1:
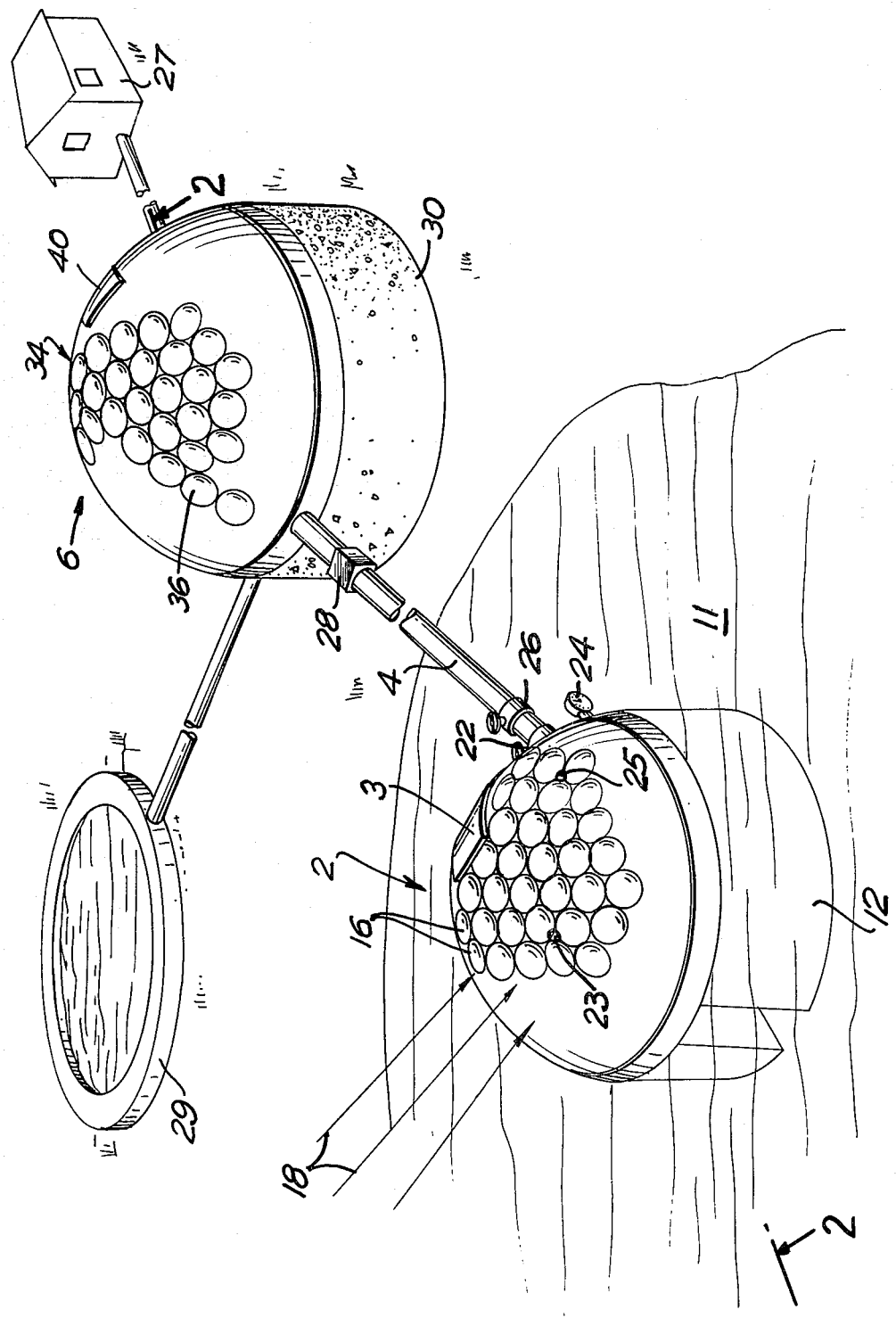
FIG. 1 is a perspective view from above of the solar steam-generating apparatus and distribution system according to the present invention.
Figure 2:
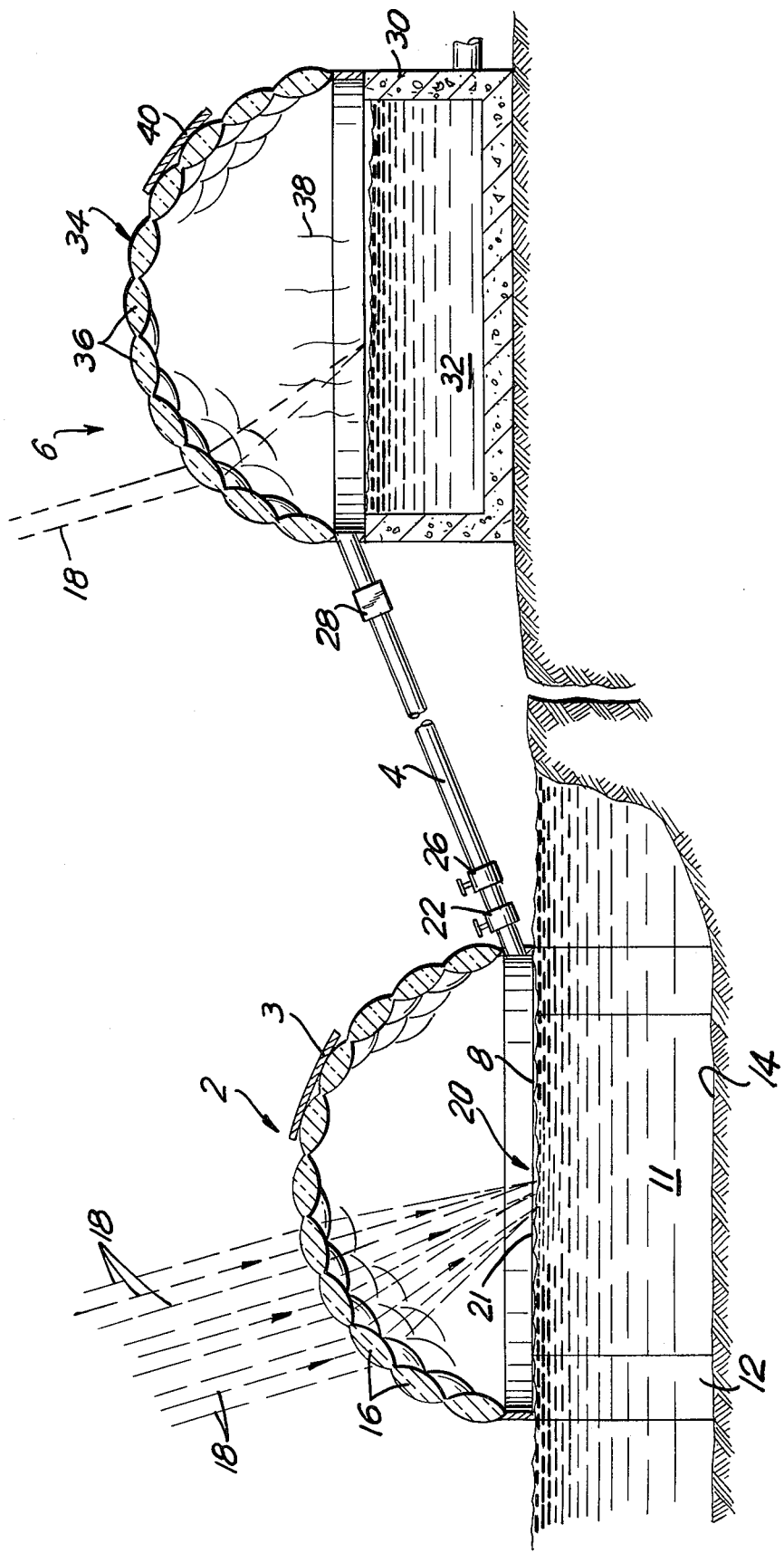
FIG. 2 is a vertical section view through the structures illustrated in FIG. 1 along the lines 2—2.

Referring to the accompanying drawing, the steam-generating apparatus is shown in general at 2 with the conduits 4 connecting the generating apparatus 2 with booster station(s) 6 in the system. The apparatus 2 is located on the surface 8 of a body of source water 11 in the embodiment illustrated. In the example shown, the water body 11 comprises salt water contaminated with sewage.

The apparatus 2 is mounted on a foundation structure 12 secured to the bottom 14 of the source of water body 11.

While shown in annular dome-like form, the structure can be in any suitable form provided lenses or prisms 16 are able to concentrate the incident solar rays indicated by lines 18 within a confined area 20 on the surface 8 of the water 11. The structure is provided with routine control systems for adjusting the azimuth and elevation of the lens-bearing surface to concentrate the available solar rays on the area 20. Such means are shown schematically at 23 and 25 respectively.

A shutter system indicated schematically by 3 may be utilized to cut off the solar rays wholly or partially from the surface 21 for control purposes. The concentration of the rays on the surface 21 serves to rapidly generate steam through the vaporization of the surface heated water. Once a head of steam is built up, the steam may be removed on a continuous basis from the apparatus 2 through the conduits 4. A valve 22 utilized to control the flow as desired.

The structure 2 is also provided with a conventional pressure gauge 24 to monitor the pressure and a pressure relief valve 26 which is both a safety valve and/or vents steam to the atmosphere when not required for distribution through conduits 4. Conduits 4 may be connected to a residence 27, swimming pool 29, or other user of the steam energy in the immeditate vicinity or to the booster station(s) 6. The steam or condensed water coming from the conduits 4 into the booster station(s) 6 travels through a one-way check valve 28 which permits flow to the booster station(s) 6 from the generator 2 but not in the reverse direction. The booster station(s) 6 includes a concrete reservoir 30 for retaining a condensed volume of water 32 and a lens covering structure 36 for regenerating the steam from the hot water 32 or putting more energy into the steam vapor 38 if it has not been condensed. The dome 34 shown is provided with shutter 40 to prevent overheating of the reservoir 6 if there is no water therein or preventing vaporization of the water 32 if there is no need for steam. The shutters 40 may be manually or automatically controlled.

It is evident that the system, in addition to providing energy for heat in the form of steam and hot water, may utilize the rays of the sun to transport water from the source 11 through a distribution system to irrigate distant land and higher elevations by distribution through the booster station 6 system.

The apparatus of the invention also serves to purify contaminated source water through the vaporization process, providing an efficient means, for instance, to obtain potable water from salt water and/or water contaminated with sewage.

While the invention has been explained by a detailed description of certain specific embodiments, it is understood that various modifications and substitutions can be made in any of them within the scope of the appended claims which are intended also to include equivalents of such embodiments.

What is claimed is:

1. A system for the generation and distribution of steam by solar energy comprising apparatus for the solar energy generation of steam comprising an enclosed structure over the surface of a body of source water, said enclosed structure having a plurality of transparent lenses, said lenses adapted to receive incident solar rays and focus said rays at or just below the surface of said source water within a limited area to cause surface boiling of said source water to generate steam within said enclosed structure, and distribution conduits from said structure to a place remote from said structure and booster stations communicating with said apparatus through said conduits, said booster stations comprising a reservoir for storing condensed water from said apparatus, an enclosure over said reservoir including at least one transparent lens to focus incident solar rays at or just below the surface of said condensed water in said reservoir within a limited area to regenerate steam within said station, and outgoing distribution conduits to places remote from said booster stations.

2. A system as claimed in claim 1 wherein said conduit between said apparatus and said booster station has a checkvalve to prevent water from flowing from said booster station back to said apparatus.

3. A system as claimed in claim 1 wherein said booster station is at a higher elevation than said apparatus.

* * * * *